May 30, 1950 H. K. KRANTZ 2,509,931
ROTARY MULTIPLE CONTACTOR
Filed Dec. 10, 1946 3 Sheets-Sheet 3

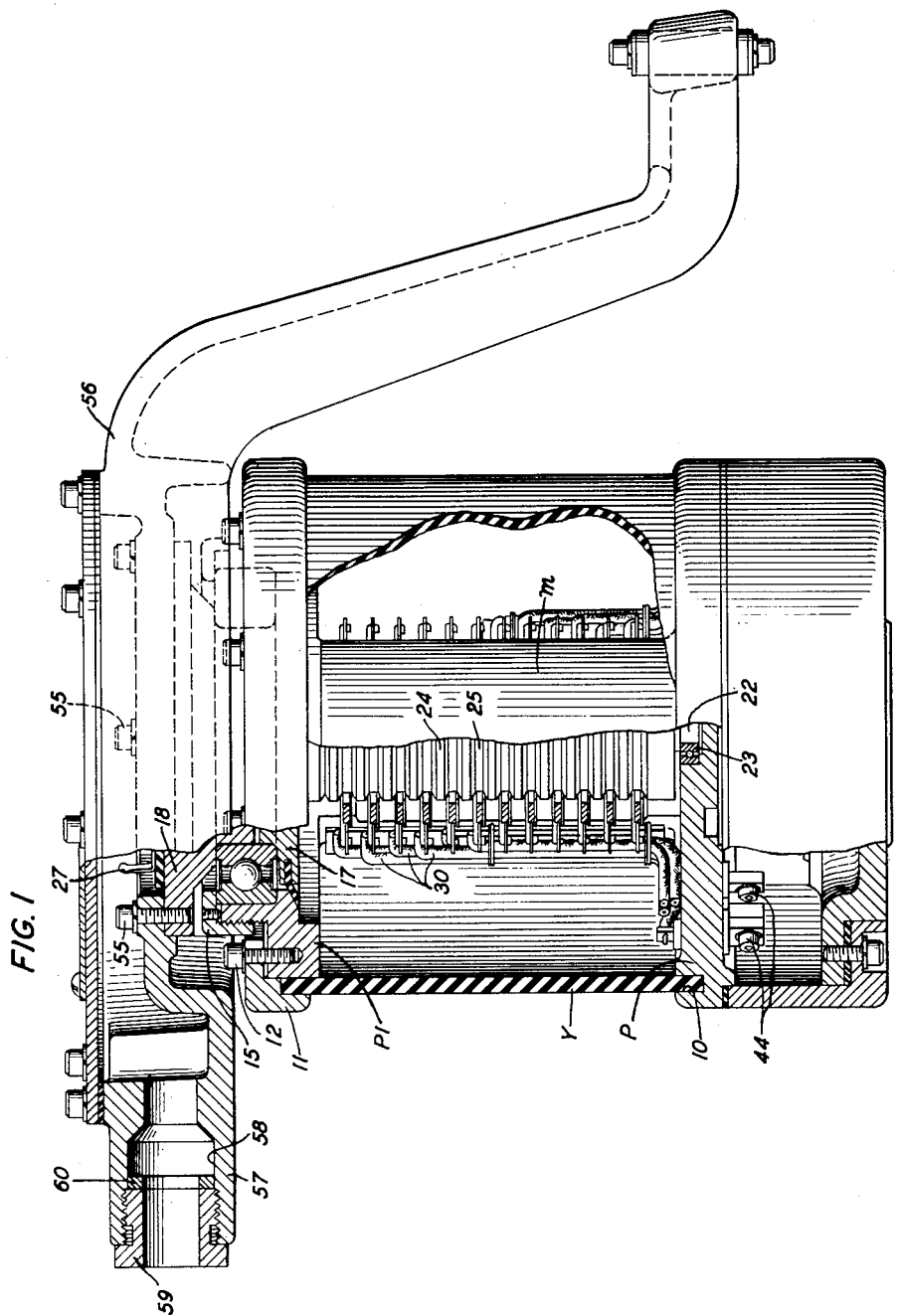

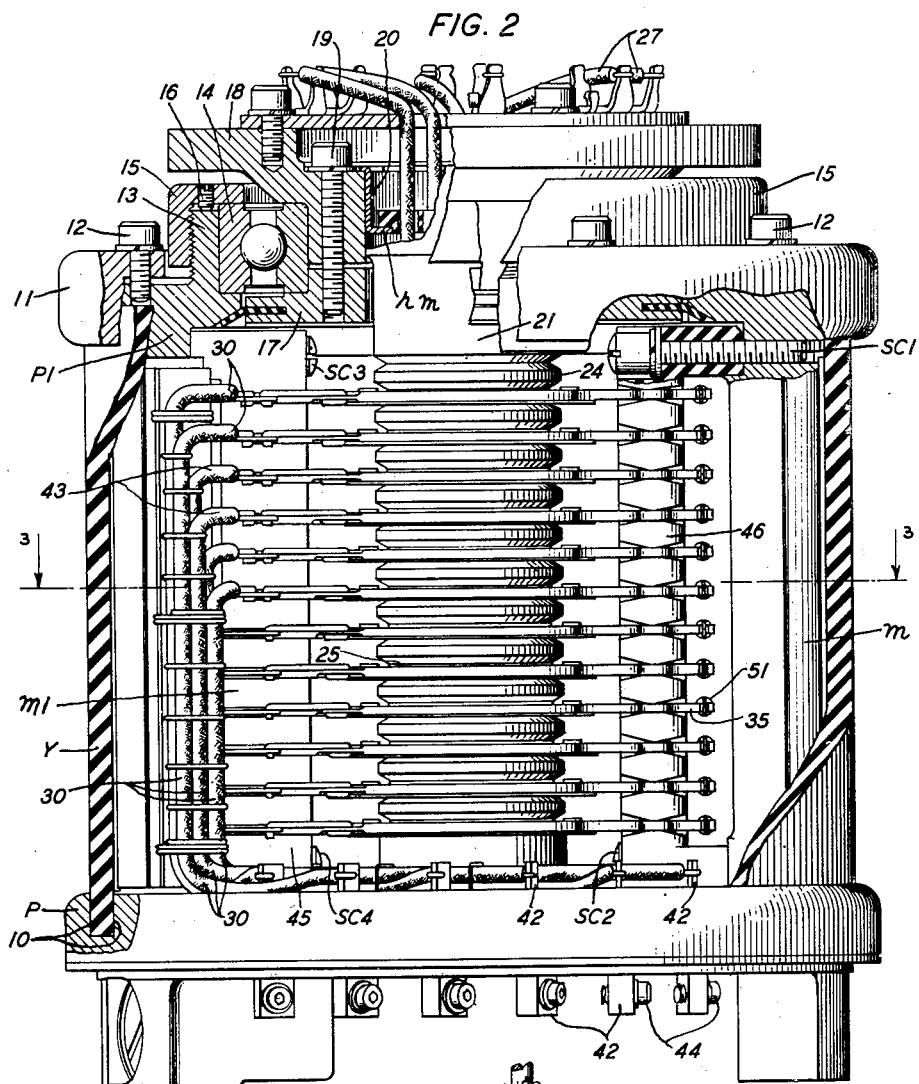
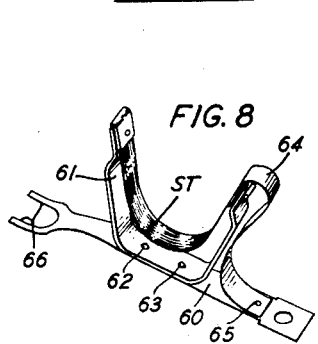
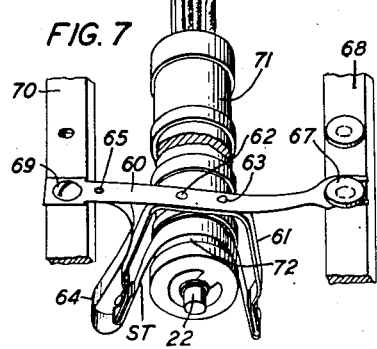
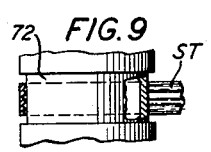

INVENTOR
H. K. KRANTZ
BY J. MacDonald
ATTORNEY

Patented May 30, 1950

2,509,931

UNITED STATES PATENT OFFICE 2,509,931

ROTARY MULTIPLE CONTACTOR

Hubert K. Krantz, Rockville Centre, N. Y., assignor to Bell Telephone Laboratories, Incorporated, New York, N. Y., a corporation of New York Application December 10, 1946, Serial No. 715,208

4 Claims. (Cl. 173—324)

This invention relates to multiple contact devices of the rotary type.

In connection with torpedo detection systems, for example, devices are used for transmitting and receiving sound waves. The received sound waves are translated into electrical energy by a series of detector devices connected by rotary contact elements to devices serving for indicating the angle and distance relative to the sound detecting apparatus, the accurate interpretation of the translated signals being to a great extent dependent upon the proper contact between the rotor element and stator element connecting the sound detector devices to their associated indicators.

Prior to this invention, the inadequacy of known rotary contactors in sonar applications necessitated a flexible cable connection to the rotatable transducer. This limited the training of the transducer in either direction and, under certain conditions, meant losing contact with the target while unwinding the transducer and cable for further use, and then, if possible, reestablishing contact.

Sonar equipments were thus restricted in their operation by the flexible cable connections to the transducer. It was not until applicant's invention was made that unlimited training was reliably achieved.

The ordinary types of rotary electrical connectors have too varying resistance to satisfactorily transmit the extremely low currents dealt with in such as the sonar applications for which it was designed and satisfactorily used during the war. To be usable in such applications, the electrical energy must be tremendously amplified and any appreciable variable resistance while rotating the contactor would give false, unstable and unreliable results. In sonar, the electrical energy translated from the sound waves is so small and the amplification (up to approximately 140 decibel gain) necessarily so large that the system is on the threshold of thermal noise. That is, even such minute changes in resistance, as fluctuations in temperature of the conducting wires would cause, are of an order that would be detrimental. That gives an idea how unvariable the contact must be between the wiping elements and why there is need for the device of this invention and its accomplishments. The use of precious metal contacts alone will not fulfill the requirements. This design permits speeds up to 300 revolutions per minute, and is very economical of space in axial direction.

The excellent wiping contact is due to several factors:

1. The precious metal wire (or tape) and ring elements are of noble metal.

2. In the primary design covered, the wires embrace the ring for about 90 degrees each—a total of 360 degrees. With "block" or "brush" contacts there is a tendency for them to wriggle during rotation of the ring, and to "rock" on reversal of rotation, causing resistance changes.

3. The wires are flexible enough for shaping themselves to the ring curvature and the parts are of such proportions and net construction as to give a magnitude of contact points sufficient to insure enough constant contacts although the parts are wiping.

4. The contact area is increased over this simple embrasure by the wires riding in contoured grooves in the rings—giving not a line contact as with a flat surface, nor a two-line contact as with a V groove, but a surface contact of maximum width. And the widest possible intimate contact surface is attained in the shortest possible wear time.

5. The flexible elements are lightweight (fine wires and aluminum supporting yokes) so that bounce or chatter is minimized for irregularities or eccentricity of the ring surface.

6. The design permits the flexible wire elements to follow any eccentricity of the contact rings and to do this without increasing the contact pressure on one side and decreasing it on the other side—which change would likely result in variable contact resistance.

7. The wire mounting permits swinging and self-adjustment of the wires with the plane of the engaging grooves in the contact ring.

8. The rubber spools, over which the contact wires ride, have several functions such as compensating for differences in length of the wires; differences in depths of the grooves or wear of the grooves or wires; differences in concentricity of the two grooves of any one ring; slope of the rings relative to the wires; and furthermore they cushion the wires and reduce or dampen the "singing" that is apt to result from smooth surfaces rubbing against each other.

9. Another novelty is that whereas slip ring contacts of satisfactory circuit capability might be made in the conventional manner, if sufficient brushes and sufficiently heavy contact pressures were used, this would result in excessive operating torques and contact wear and maintenance. On the other hand, our contactor uses low contact pressures, requires low operating torques, and low contact wear and correspondingly longer life and less maintenance results.

In a modification of this invention a ribbed noble metal tape is used in place of the two parallel wire strands, and embraces the ring. The ribs of the tape are longitudinal and placed on the contact side. By leaving only a thin connecting web between the ribs this effectively simulated a number of parallel wire strands with the advantage of all the ribs (wire substitutes) automatically being of the same length, and the further advantage of being able to get more ribs than wires in the same width and thus obviating the need for grooving the ring to obtain equivalent contact area and points. Obviously, the ring may be circularly ribbed and engaged by a thin tape, or the tape transversely grooved and engaging a smooth ring, or the ring axially grooved with a smooth or circularly ribbed tape, etc. Also, either the surface of the tape or ring may be stippled or otherwise treated to effect the same multi-contact results. Actually with the ribbed design it was found possible to use local lubrication, and the lubricant and wear particles combined and packed into the space between ribs to produce a self-lubricating surface. In this modification the tape was formed into a U-shape and engaged the ring for about 180 degrees. With this modification a smaller ring is possible, reducing the peripheral speed. The open ends of the U-shaped tape are pivotally mounted in a yoke member for self-alignment with the ring, with a flexible lead electrically shunting the pivot connection.

Prior to this invention, all other attempts had failed due to noise either at the start of use or usually after some service. That is, a new result has been achieved: (1) low resistance with use and no change in resistance, (2) wear reduced with metals required to a serviceable point, (3) low torques, and small space for many contacts.

In the drawing:

Fig. 1 is an elevation view shown partly in vertical section;

Fig. 2 is another elevation view enlarged shown with a number of operating parts removed and other operating parts partly in vertical section;

Fig. 7 is a perspective view of a modification of the support and slip ring shown in Fig. 4;

Fig. 8 is an assembly view of one of the modified supports shown in perspective; and Fig. 9 is a view of one of the slip rings and contacting strips used with the modified support, the ring and the contacting strip being shown partly in vertical section.

Figure 3:
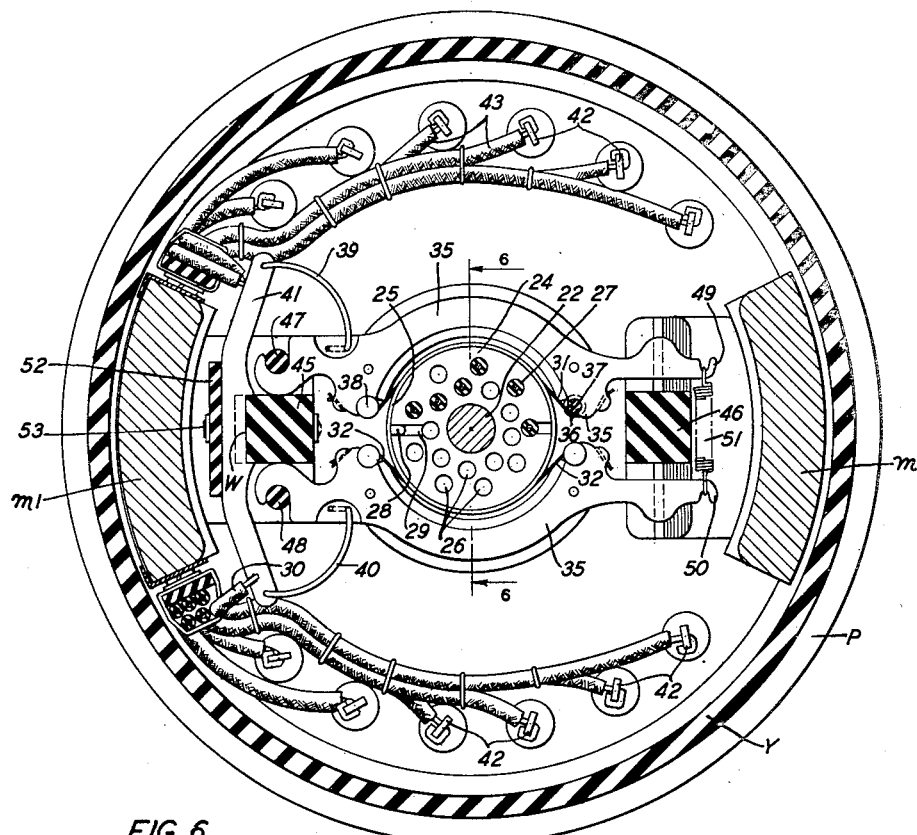
Fig. 3 is a cross-sectional view taken on line 3—3 of Fig. 2.
Figure 6:
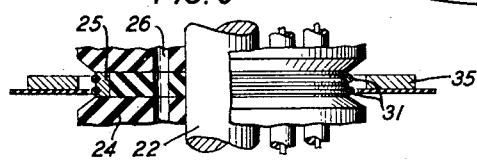
Fig. 6 is a view of one of the slip rings and its associated wire support shown partly in vertical section taken on line 6—6 of Fig. 3.

Referring to the drawing, a mounting frame is formed of two disc portions P and P1 cast with two spacer members $m$ and $m1$, the disc portion P having a circular groove 10 for receiving one end of a cylindrical casing Y, constructed preferably of transparent material, while the opposite end of this cylindrical casing is fitted over the periphery of disc portion P1 as best seen in Figs. 1 and 2, and secured in position on the mounting frame thus formed by a clamping ring 11 itself secured to the disc portion P1 by a plurality of screws 12.

The disc portion P1 is formed with an upwardly extending circular rim 13 forming a recess for receiving the outer race of a ball bearing 14 which is held securely in the recess by a ring 15 threadedly engaging the outer periphery of rim 13, the ring 15 being held in the tightened position by a set screw 16.

On the inner disposed race of ball bearing 14 are mounted the rings 17 and 18 held collectively securely thereon by a plurality of screws 19 which also serve for securing a ring-shaped member 20 onto the ring 18, while a rim portion $rm$ formed with ring member 20 is embedded in a cylindrically shaped headpiece 21 of insulating material mounted on a vertically disposed supporting shaft 22, Figs. 1 and 3, having its lower disposed end fitted into a ball bearing 23 disposed in a counterbore at the center of disc portion P of the mounting.

Figure 4:
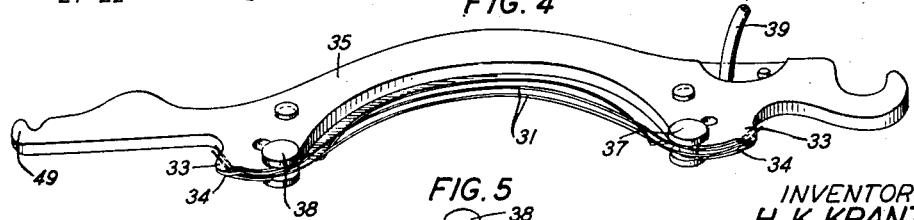
Fig. 4 is a view of one of the supports for the contacting wires shown with the equalizers for the contacting wires and the contacting wires in position thereon.
Figure 5:
Fig. 5 is a view of an equalizer for the contacting wires shown in perspective.

On shaft 22 are mounted in superposed relation to each other, as shown in Figs. 1, 2, 3 and 6, a plurality of spool-shaped members 24 of insulating material each fitted with a slip ring 25. These spool-shaped members are provided with registering drilled holes 26, best seen in Figs. 3 and 6, serving as guide-ways for the different conducting wires 27 having one of their ends connected as by soldering to respective terminals 28 fitted into radially disposed grooves 29 formed in the spool-shaped members 24 and connecting with the slip rings 25, the opposite ends of wires 27 being soldered to respective terminals carried on an insulating disc on the ring-shaped member 18 as best seen in Fig. 2. The connections from the slip rings 25 to similar disposed ends of conducting wires 30, as best seen in Figs. 1, 2 and 3, are effected by diametrically disposed pairs of wires 31 and 32, each pair of wires, as best seen in Fig. 4 having their opposite ends clamped between lugs as 33 and 34, formed with an arcuate support 35 and secured to such a support as by soldering in addition to the clamping action of lugs 33 and 34.

Supports 35, as best seen in Fig. 3, are provided with grooves as 36 for receiving the spools 37 and 38 constructed of resilient material such as rubber, serving as equalizers for controlling the contact pressure of the pairs of wires 31 and 32 in the grooves of the slip rings 25 and maintaining the wires concentric relative to their respective slip rings 25 on insulating discs 24 while connections from the pairs of associated supports 35 to common terminals 41 are effected by conductors 39 and 40, best seen in Fig. 3, the terminals 41 being in turn connected to respective terminals as 42 insulatively carried by the disc-shaped portion P of the mounting wires 30 best seen in Fig. 2, while the terminals 42 are provided with connecting screws 44 for securing the ends of other conducting wires leading to the signal transmitting and receiving apparatus, not shown, and which form no part of the present invention.

The arcuated wire supports 35 as shown in Figs. 2 and 3 are mounted in superposed relation to each other in planes relative to their respectively associated slip rings 25 on a pair of upright supports in the form of bars 45 and 46 of insulating material secured to the spacer members $m$ and $m1$ of the mounting frame by a plurality of screws SC1, SC2, SC3 and SC4 best seen in Fig. 2, the supports 45 and 46 having horizontally disposed slots in their opposite sides provided for freely receiving the end portions of the wire supports 35. Upright support 45 is provided with two drilled holes disposed parallel relative to its longitudinal axis for receiving two rods 47 and 48 of insulating material serving as pivots for the wire supports 35, while the end portions of wire supports 35 adjacent to the upright insulating bar support 46 are provided with hook portions as 49 and 50 for hooking the ends of springs 51 serving to draw the supports toward each other for engaging the contact wires 31 carried thereby in the grooves of their respectively associated slip rings with a predetermined contact pressure.

The upright bar support 45 as best seen in Fig. 3 is provided with transversely disposed grooves W for receiving the terminals 41 which are secured collectively in position therein by an insulating strip 52 and a plurality of screws 53.

Onto the ring 18, as best seen in Fig. 1, is secured as by a number of screws 55, the rim portion of a lever member 56 serving for actuating the rotor element thus constructed relative to the wire supports 35. Lever member 56 is formed with a radial projection 57 having an opening 58 for receiving one end of a cable for connection with the terminals 21, the cable being securely held in the opening 58 of projection 57 by a nut 59 and ring 60 in the manner of a stuffing box which forms no part of the present invention.

In the modification shown in Figs. 7, 8 and in the enlarged Fig. 9, the support for the contacting strip ST consists of a conducting resilient mounting element 60, a U-shaped conducting element 61 secured to mounting 60 as by rivets 62 and 63, a conducting strip ST having its ends pivoted to the U-shaped conducting element 61 for self-adjustment relative to slip rings 72 and a conducting strip 64 clamped between one end of the U-shaped conducting element 61 and the end of strip ST, while the opposite end of strip 64 is secured, as by rivet 65, to the resilient mounting element 60. The mounting element 60 terminates at one end in a forked portion 66, the prongs of which are slipped between the head of a contact pressure adjusting stud 67 and an insulating supporting bar 68, as shown in Fig. 7, while the opposite end of this support is provided with a drilled hole for receiving a screw 69 engaging a similarly tapered hole in the insulating bar or support 70 for securing the contact assembly thus formed to supports 68 and 70 disposed in parallel relation with the longitudinal axis of a rotor element 71 formed by a number of slip rings 72, shown in enlarged view in Fig. 9 corresponding to the number of contacting strips used which may be in any number desired, the contacting strip ST in this modification being formed with a series of parallelly disposed ribs engaging the periphery of slip rings 72, the ribs forming the contacting strip having the advantage of locating a greater point of contact for a given width of slip ring, thus obviating the necessity of grooving the slip ring in order to obtain an equivalent contact area.

What is claimed is:

1. A multicontact device comprising a shaft, a plurality of disc-shaped members of insulating material mounted on said shaft, a slip ring of conducting material fitted at the periphery of each of said members, said members having a plurality of registering openings, a conducting wire in each of said openings extending for connection with one of said slip rings on said shaft, a plurality of pairs of contact elements engaging each of said slip rings, a support of conducting material for each pair of said contact elements, a pair of supports of insulating material having means for locating said conducting supports and thereby said pair of contact elements in registering relation with their respective slip rings, a terminal carried by one of said insulating supports for each pair of said contact elements, and conducting means connecting said contact elements in each pair with said terminals.

2. A contact device comprising a rotatable shaft, a disc of insulating material secured on said shaft, a first contact means comprising a slip ring secured at the periphery of said disc, a pair of supports disposed diametrically opposite said slip ring, a second contact means comprising members mounted by said supports, one of said first and second means having grooves therein and the other of said means having portions fitting into said grooves, a support of insulating material having means for pivotally receiving said contact member supports, another support having means for receiving the other end of said contact member supports for holding each of said supports in a plane common to the plane of rotation of said insulating disc, and spring means engaging said contact member supports to cause said contact members to contact with said slip ring with a predetermined contact pressure.

3. A contact device comprising a rotatable shaft, a disc of insulating material secured on said shaft, a slip ring secured at the periphery of said disc, said slip ring having a plurality of circular grooves formed at the periphery thereof, a pair of supports disposed diametrically opposite said slip ring having conducting wires engaging the grooves in said slip ring, a support of insulating material having means for pivotally receiving said contact wire supports at one of their ends, another support having means for receiving the opposite ends of said contact wire supports for holding each of said wire supports in a plane common to the plane of rotation of said insulating disc, and spring means engaging said contact wire supports to cause said wires to contact with said slip ring with a predetermined contact pressure.

4. A contact device comprising a rotatable shaft, a disc member of insulating material mounted on said shaft for rotation therewith, a slip ring carried by said disc, a pair of arcuate supports disposed diametrically opposite said slip ring, a set of conducting wires having their ends secured to means formed with said supports and engaging the outer disposed periphery of said slip ring, and resilient member carried by said supports and engaged by said conducting wires for permitting the self-adjustment of the latter as to concentricity relative to the periphery of said ring.

HUBERT K. KRANTZ.

REFERENCES CITED

The following references are of record in the file of this patent:

UNITED STATES PATENTS

| Number | Name | Date |
|---|---|---|
| 1,480,656 | Blackburn | Jan. 15, 1924 |
| 2,200,794 | Krantz | May 14, 1940 |
| 2,237,283 | Baskerville | Apr. 8, 1941 |
| 2,416,498 | Ruddock | Feb. 25, 1947 |

FOREIGN PATENTS

| Number | Country | Date |
|---|---|---|
| 428,099 | Great Britain | May 7, 1935 |